United States Patent
Hopkins et al.

(10) Patent No.: US 10,320,733 B2
(45) Date of Patent: *Jun. 11, 2019

(54) PRIORITIZATION OF LOCK ALLOCATION

(71) Applicant: International Business Machines Corporation, Armonk, NY (US)

(72) Inventors: Graham D. Hopkins, Eastleigh (GB); Timothy J. Quigly, Basingstroke (GB); Luke D. C. Saker, Eastleigh (GB); Craig H. Stirling, Hedge End (GB); Matthew B. White, Bishop's Waltham (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/936,486

(22) Filed: Mar. 27, 2018

(65) Prior Publication Data

US 2018/0219826 A1    Aug. 2, 2018

Related U.S. Application Data

(63) Continuation of application No. 14/726,649, filed on Jun. 1, 2015, now Pat. No. 9,961,034.

(51) Int. Cl.
  *H04L 12/58*    (2006.01)
(52) U.S. Cl.
  CPC .................................. *H04L 51/26* (2013.01)
(58) Field of Classification Search
  CPC ...... H04L 47/762; H04L 51/063; H04L 51/26
  See application file for complete search history.

(56) References Cited

U.S. PATENT DOCUMENTS

| | | |
|---|---|---|
| 8,139,596 B2 | 3/2012 | Gale et al. |
| 8,938,515 B2 | 1/2015 | Nikolov et al. |

(Continued)

FOREIGN PATENT DOCUMENTS

| | | |
|---|---|---|
| EP | 1989843 B1 | 2/2007 |
| JP | 4993905 B2 | 8/2012 |

OTHER PUBLICATIONS

IBM, "Method and System for Prioritizing Message Delivery across Competing Consumers with Overlapping Wildcards Selectors", An IP.com Prior Art Database Technical Disclosure, Original Publication Date: Nov. 23, 2009, IP.com No. 000190261, IP.com Electronic Publication: Nov. 23, 2009, pp. 1-5.

(Continued)

*Primary Examiner* — El Hadji M Sall
(74) *Attorney, Agent, or Firm* — Brian M. Restauro

(57) ABSTRACT

Aspects of the present invention disclose a method, computer program product, and system for prioritization of lock allocation. The method includes one or more computer processors receiving a first message in a queue of messages. The method further includes one or more computer processors determining whether the received first message is related to one or more messages in the queue. The method further includes one or more computer processors responsive to determining that the first message is related to one or more messages in the queue, assigning a priority value to the first message. The method further includes one or more computer processors assigning a priority order to the first message, wherein the priority order indicates a position in which the first message is granted access to a resource lock.

17 Claims, 6 Drawing Sheets

(56) References Cited

U.S. PATENT DOCUMENTS

| | | | | |
|---|---|---|---|---|
| 2008/0071403 A1* | 3/2008 | Conway | ............... | C30B 1/02 |
| | | | | 700/97 |
| 2012/0076152 A1 | 3/2012 | Mansharamani | | |
| 2012/0089735 A1 | 4/2012 | Attaluri et al. | | |
| 2013/0013702 A1* | 1/2013 | Ebisawa | ............... | G06F 15/16 |
| | | | | 709/206 |
| 2016/0352663 A1 | 12/2016 | Hopkins et al. | | |

OTHER PUBLICATIONS

Appendix P—List of IBM Patents or Patent Applications Treated as Related, Filed herewith, 2 Pages.

\* cited by examiner

402

| Received Message | Relationship | Priority Order |
|---|---|---|
| M$_A$ | A_Seg_1_of_3 | M$_A$, First |
| M$_B$ | None | M$_B$, Second |
| M$_C$ | A_Seg_2_of_3 | M$_C$, Third |
| M$_D$ | None | M$_D$, Fourth |
| M$_E$ | None | M$_E$, Fifth |
| M$_F$ | A_Seg_3_of_3 | M$_F$, Sixth |

| Received Message | Grouped Relationship | Priority Value | Reordered Priority Order |
|---|---|---|---|
| M$_A$ | A_Seg_1_of_3 | 1 | M$_A$, First |
| M$_B$ | A_Seg_2_of_3 | 1 | M$_C$, Second |
| M$_C$ | A_Seg_3_of_3 | 1 | M$_F$, Third |
| M$_D$ | None | 2 | M$_B$, Fourth |
| M$_E$ | None | 2 | M$_D$, Fifth |
| M$_F$ | None | 2 | M$_E$, Sixth |

FIG. 4B

| Received Message | Relationship | Priority Order |
|---|---|---|
| $M_A$ | A_Seg_1_of_3 | $M_A$, First |
| $M_B$ | A_group 1_of 2 | $M_B$, Second |
| $M_C$ | A_Seg_2_of_3 | $M_C$, Third |
| $M_D$ | None | $M_D$, Fourth |
| $M_E$ | A_Seg_3_of_3 | $M_E$, Fifth |
| $M_F$ | A_group 2_of 2 | $M_F$, Sixth |

FIG. 5A

| Received Message | Grouped Relationship | Priority Value | Reordered Priority Order |
|---|---|---|---|
| $M_A$ | A_Seg_1_of_3 | 1 | $M_A$, First |
| $M_B$ | A_Seg_2_of_3 | 1 | $M_C$, Second |
| $M_C$ | A_Seg_3_of_3 | 1 | $M_E$, Third |
| $M_D$ | A_group 1_of 2 | 1 | $M_B$, Fourth |
| $M_E$ | A_group 2_of 2 | 1 | $M_F$, Fifth |
| $M_F$ | None | 2 | $M_D$, Sixth |

FIG. 5B

PRIORITIZATION OF LOCK ALLOCATION

BACKGROUND OF THE INVENTION

The present invention relates generally to the field of lock allocation, and more particularly to prioritization of locks in messaging systems.

In general, a messaging system enables "program-to-program" messaging between one or more applications and systems throughout an enterprise. Typically, its software interface enables loosely coupled asynchronous data (e.g., messages) to be sent by one program, which is stored in a message queue until the receiving program is able to process it. Message queues may have explicit or implicit file size restrictions thus necessitating that large files be segmented or sent in batches. Locks are used as a synchronization mechanism for enforcing limits on access to a resource (e.g., a communications unit) in an environment where there are many threads of execution (e.g., multiple messages waiting for transmission).

SUMMARY

Aspects of the present invention disclose a method, computer program product, and system for prioritization of lock allocation. The method includes one or more computer processors receiving a first message in a queue of messages. The method further includes one or more computer processors determining whether the received first message is related to one or more messages in the queue. The method further includes one or more computer processors responsive to determining that the first message is related to one or more messages in the queue, assigning a priority value to the first message. The method further includes one or more computer processors assigning a priority order to the first message, wherein the priority order indicates a position in which the first message is granted access to a resource lock.

BRIEF DESCRIPTION OF THE DRAWINGS

FIG. 4A is an example table depicting an example resource lock priority order before prioritization and reordering of the priority order, regardless of message relatedness, in accordance with an embodiment of the present;

FIG. 4B is an example table depicting an example resource lock priority order after prioritization and reordering of the priority order, in accordance with an embodiment of the present invention;

FIG. 5A is an example table depicting an example resource lock priority order between related messages before prioritization and reordering of the priority order, in accordance with an embodiment of the present invention;

FIG. 5B is an example table depicting an example resource lock priority order after prioritization and reordering of the priority order, in accordance with an embodiment of the present invention.

DETAILED DESCRIPTION

Embodiments of the present invention recognize that there are ineffective ways to manage resource locks in a messaging system. In instances where messaging systems are processing large data files and a series of related messages, receiving systems can experience "lag" as each segmented data file and series of related messages are queued on a first come, first served basis before being granted access to a resource lock. For example, a messaging system can receive a large data file for transmission that exceeds a message queue file size restriction. The messaging system begins segmenting the large data file into segments $S_{A-C}$. Before the messaging system finishes segmenting the large data file, the messaging system receives a series of related messages (messages $M_{1-3}$). Thus, in this example, the message queue could look like segment $S_A$, segment $S_B$, message $M_1$, message $M_2$, segment $S_C$, and message $M_3$ and would be assigned the resource lock based on that order. Embodiments of the present invention provide solutions for prioritizing and ordering message queues based, at least in part, on message relatedness (e.g., segments $S_{A-C}$ are granted access to the resource lock before and messages $M_1$ and $M_2$). In this manner, as discussed in greater detail in this specification, embodiments of the present invention can be used to provide an efficient processing of segmented or batched messages which reduces the "lag" time of a receiving system.

Figure 1:
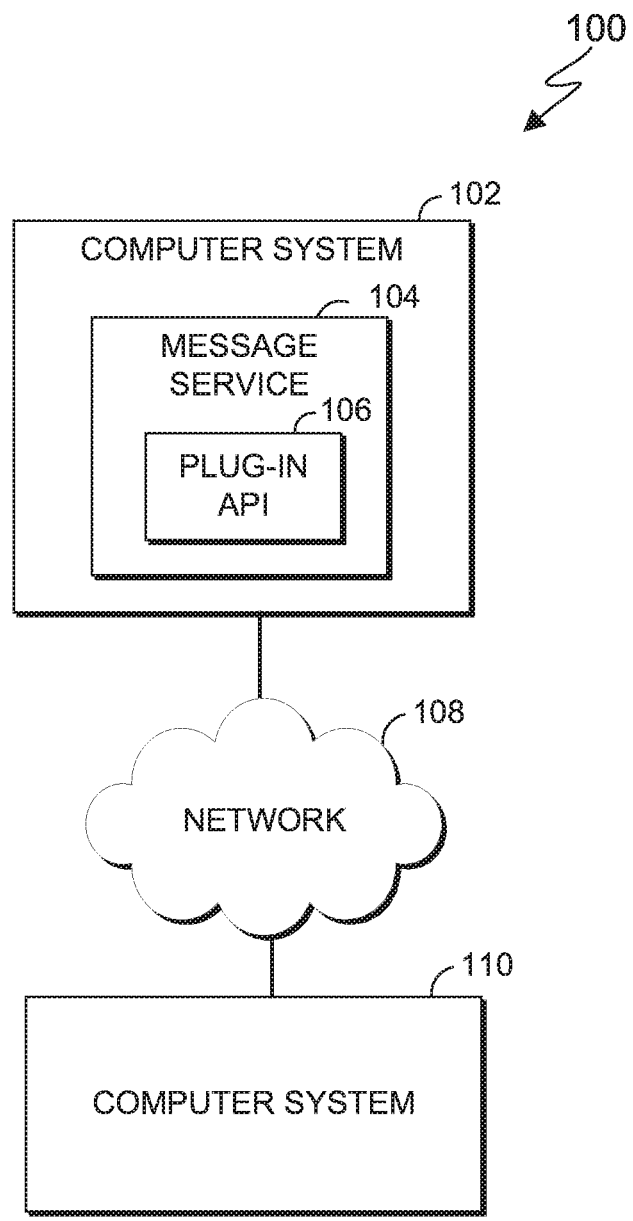
FIG. 1 is a block diagram of a computing environment, in accordance with an embodiment of the present invention.

FIG. 1 is a functional block diagram of computing environment 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes computer system 102, computer system 110, and network 108. Computer system 102 and computer system 110 can be desktop computers, laptop computers, specialized computer servers, or any other computer systems known in the art. In certain embodiments, computer system 102 and computer system 110 represent computer systems utilizing clustered computers and components to act as a single pool of seamless resources when accessed through network 108. For example, such embodiments may be used in data center, cloud computing, storage area network (SAN), and network attached storage (NAS) applications. In certain embodiments, computer system 102 and computer system 110 represent virtual machines. In general, computer system 102 and computer system 110 are representative of any electronic devices, or combination of electronic devices, capable of executing machine-readable program instructions, as described in greater detail with regard to FIG. 6.

Computer system 102 includes message service 104. Message service 104 includes plug-in application program interface (plug-in API) 106 and communicates with computer system 110 via network 108 (e.g., using TCP/IP) to access, send, receive, and organize messages. Message service 104 can be implemented, for example, using a browser and web service that can access, organize, send, and receive messages. For illustrative purposes, this embodiment may be discussed with respect to computer system 102 facilitating sending messages and receiving messages between computer system 102 and computer system 110, it being understood that computer system 110 can facilitate sending and receiving messages from one or more components in computing environment 100.

Figure 3:
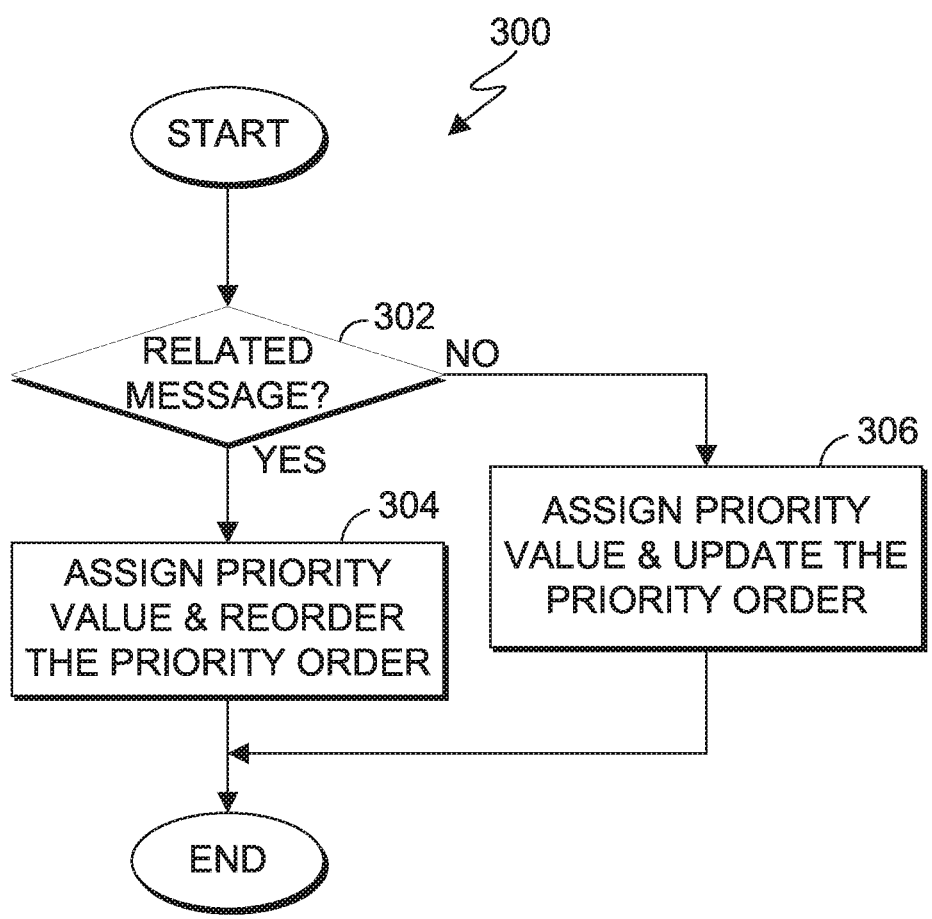
FIG. 3 is a flowchart illustrating operational steps for assigning priority values and priority orders, in accordance with an embodiment of the present invention.

Plug-in API 106 is a prioritization program that assigns a priority value to threads (e.g., messages) that determines the priority order (i.e., the order which indicates respective positions in which messages are assigned an available resource lock) based, at least in part on message relatedness, as discussed in greater detail with regard to FIG. 3.

A "priority value," as used herein, indicates the importance of processing a particular message, and is used to assign a priority order for a message in a resource lock queue. In this embodiment, plug-in API 106 utilizes a numerical priority scale to rank messages, where lower numbers represent greater priority and higher numbers represent lesser priority. In other embodiments, plug-in API 106 can use any desirable priority scale. Furthermore, in this embodiment, the priorities of particular messages can change dynamically according to changes in operating conditions and usage.

In this embodiment, a priority order is based on the assigned priority value and refers to the order in which messages are granted access to the resource lock. For example, plug-in API 106 can receive three messages $M_{A-C}$, in the following order: message $M_B$, message $M_C$, and Message $M_A$. In this example, message $M_B$ can have a priority value of "2". Message $M_C$ can have a priority value of "1" and message $M_A$ can have a priority value of "3". Accordingly, the priority order of messages $M_{A-C}$ would be: message $M_C$ followed by message $M_B$, followed by message $M_A$.

The term "message relatedness," as used herein, refers to a classification system wherein messages can be related as part of a group (e.g., group one consisting of Messages $M_{1-3}$) or as segments that are part of a larger file (e.g., file X split into three segments). Each message contains identifiers that allow plug-in API 106 to determine whether the message is related. For example, identifiers could be "grp" and "seg" in a file name, which indicate that the message is either part of a group or is a segment of a larger, multi-part message, respectively.

Network 108 can be, for example, a local area network (LAN), a wide area network (WAN) such as the Internet, or a combination of the two, and include wired, wireless, or fiber optic connections. In general, network 108 can be any combination of connections and protocols that will support communications between computer system 102, computer system 110, message service 104, and plug-in API 106, in accordance with a desired embodiment of the invention.

Figure 2:
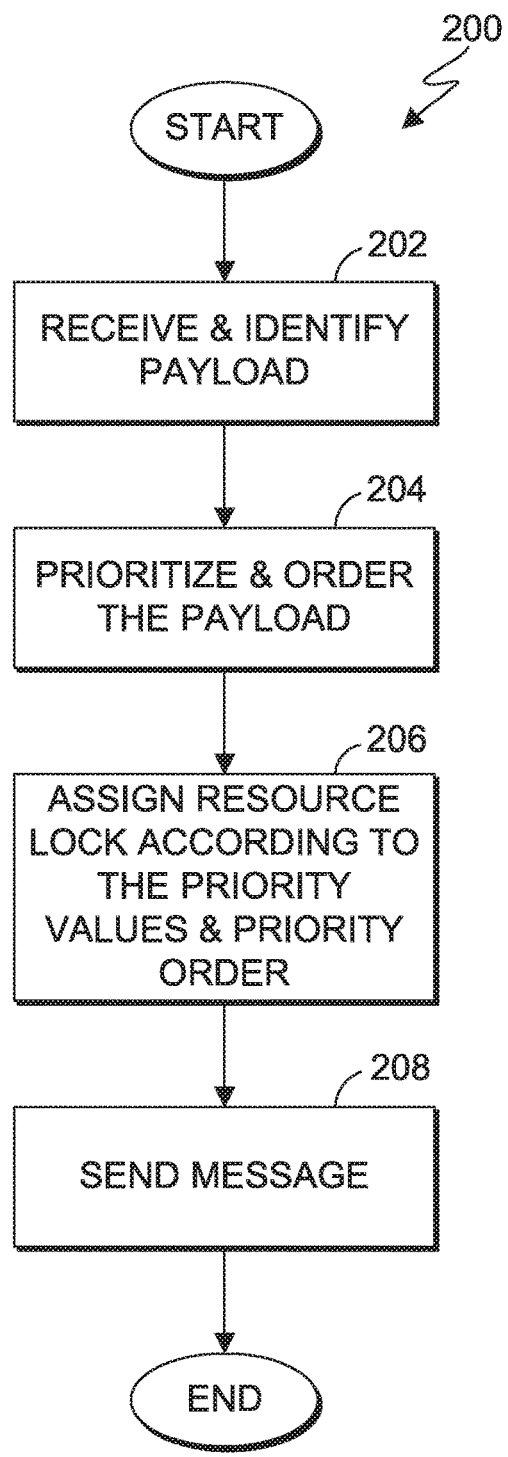
FIG. 2 is a flowchart illustrating operational steps for prioritizing a message, in accordance with an embodiment of the present invention.

FIG. 2 is a flowchart 200 illustrating operational steps for prioritizing a message, in accordance with an embodiment of the present invention.

In step 202, plug-in API 106 receives and identifies a payload from message service 104. In this embodiment, a payload can comprise one or more messages. In instances where a payload comprises more than one message, plug-in API 106 can identify each respective message in a payload by reading identifiers such as "grp" and "seg" that indicates the respective message is part of a group of messages or a segment of a larger message. In response to identifying that received messages in the payload are part of a group of messages or a segment of a larger message, plug-in API 106 can identify messages in the resource lock queue to determine message relatedness, as discussed in greater detail with regard to FIG. 3. In other embodiments, plug-in API 106 can receive a payload from one or more other components of computing environment 100.

In step 204, plug-in API 106 prioritizes the payload (i.e., message). In this embodiment, plug-in API 106 assigns a priority value to the received message and reorders the priority order of the resource lock queue according to message relatedness, as discussed in greater detail with regard to FIG. 3. For example, plug-in API 106 could receive a message and identify that the received message is part of a group. In response to receiving a message, plug-in API 106 can access the resource lock queue and identify messages containing the same identifiers and assign priority values based, at least in part, on the identifiers. As previously discussed, plug-in API 106 utilizes a numerical priority scale to rank messages, where lower numbers represent greater priority and higher numbers represent lesser priority. In this embodiment, plug-in API 106 assigns related messages a priority value of "1." Plug-in API 106 assigns messages that are not related a priority value of "2." In other embodiments, plug-in API 106 can assign related messages any user-defined priority value. For example, plug-in API 106 can assign an error message a priority value of "1" effectively prioritizing error messages ahead of related messages. Thus, plug-in API 106 can assign related messages a priority value of "2" while assigning unrelated messages a priority value of "3."

In step 206, plug-in API 106 assigns a resource lock according to the assigned priority values and priority order. For example, payloads (e.g., messages) assigned a priority value of "1" will receive the resource lock before a payload assigned a priority value of "2." As between two messages assigned a priority value of "1," the priority order (i.e., the order in which messages are granted access to the resource lock) is assigned based, at least in part, on order of receipt. For example, messages $M_2$ and $M_6$ both have a priority value of "1." However, message $M_6$ was received first, therefore plug-in API 106 assigns (i.e., grants access to) the resource lock to Message $M_6$ before message $M_2$. Accordingly, the priority order for the resource lock queue would be $M_6$, followed by $M_2$.

In step 208, plug-in API 106 transmits instructions to send the message according to the priority order. Message service 104 can then transmit the message to the recipient indicated in the received payload. For example, message service 104 can identify from the received message that intended recipient is computer system 110. Accordingly, message service 104 can send the received message to computer system 110.

FIG. 3 is a flowchart 300 illustrating operational steps for assigning priority values and priority orders, in accordance with an embodiment of the present invention. For example the operational steps of flowchart 300 can be performed at step 204 of flowchart 200.

In step 302, plug-in API 106 determines whether the received payload (i.e., message) is a related message. In this embodiment, plug-in API 106 determines whether the received message is related to a previously received message by reading the file name to identify that the received message is segment of a larger file or if the message is part of a series (i.e., batched) of messages already in the resource lock queue. In this embodiment, plug-in API 106 can read the file name for identifiers such as "grp" and "seg," which indicate the file is part of a group or segment, respectively. For example, a resource lock queue could have two messages, $M_1$ and $M_2$. Plug-in API 106 can then receive message $M_3$ and read the file name as "A_seg_2_of_2" to determine that message $M_3$ is a segment. Plug-in API 106 can then identify from the resource lock queue that message $M_2$ is a related message whose file name indicates that message $M_2$ is "A_seg_1_of_2".

In response to determining that the received payload (i.e., message) is a related message (step 302, yes branch), then, plug-in API 106 assigns a priority value and reorders the corresponding priority order of the resource lock queue (step 304). In this embodiment, plug-in API 106 assigns a priority value based on whether the received message is related to a previously received message in the queue. For example, plug-in API 106 assigns a received message that is related to a previously received message in the queue a priority value of "1." In this embodiment, plug-in API 106 reorders the corresponding priority order based on the priority values. For example, plug-in API 106 can have a resource lock queue comprising the following priority order: message $M_1$ having an assigned priority of "1" and $M_2$ having an assigned priority of "2." Plug-in API 106 can then receive message $M_3$ and identify that message $M_3$ is related to message $M_1$. Responsive to determining that message $M_3$ is related to message $M_1$, plug-in API 106 assigns message $M_3$ a priority of "1" and reorders priority order of the resource lock queue by grouping message $M_3$ with message $M_1$. Thus, the reordered priority order of the resource lock queue would now have the following priority order: $M_1$ having a priority of 1, message $M_3$ having a priority of 1, and message $M_2$ having a priority of 2.

Where two or more messages have the same assigned priority value, plug-in API 106 can order the messages based on receipt. For example, plug-in API 106 can receive message $M_2$ having an assigned priority value of "1" first, and receive message $M_1$ having an assigned priority value of "1" second. Plug-in API 106 can then reorder the priority order of the respective messages based on receipt. Thus, the reordered priority order would have message $M_2$ first, and message $M_1$, second. Accordingly, because message $M_2$ was received first, plug-in API 106 assigns message $M_2$ (i.e., grants access) to the resource lock first, followed by message $M_2$.

In another example, plug-in API 106 can receive an "error message" related to one or more messages in the resource lock queue. In this embodiment, where plug-in API 106 receives an error message that is related to a larger file or a batched group of message, plug-in API 106 can assign a higher priority value to the error message and reorder the priority order so that error message is granted access to the resource lock first (i.e., processed before wasting resources transmitting the other messages only to receive an error message later). For example, plug-in API 106 can assign a priority value of "0" to the received error message and reorder the priority order so that the error message is granted access before the segments of messages or batched messages the error message is related to.

In response to determining that the received payload (i.e., message) is not a related message (step 302, no branch), plug-in API 106 assigns a priority value and updates the corresponding priority order of the resource lock queue (step 306). In this embodiment, plug-in API 106 assigns a priority value of "2" to the received, unrelated message. In this embodiment, plug-in API 106 updates the corresponding priority order to include the received message, based on order of receipt. In other words, plug-in API 106 does not reorder the corresponding priority order but simply appends the received message(s) that are unrelated based on order of receipt.

For example, the priority order for a resource lock queue could be messages $M_{A-C}$ in that order, each with a priority value of "1." Plug-in API 106 can receive two messages $M_D$ and $M_E$, in that order. Plug-in API 106 can then read the file name of messages $M_D$ and message $M_E$ and identify that neither of messages $M_D$ and $M_E$ are related to other messages (e.g., messages $M_{A-C}$) already in the resource lock queue. Plug-in API 106 then assigns messages $M_D$ and $M_E$ a priority value of "2." Plug-in API 106 can then update the priority order of the resource lock queue by adding messages $M_D$ and $M_E$ to the priority order based on the order that messages $M_D$ and $M_E$ were received. Thus, the updated priority order of the received messages would be messages $M_{A-E}$, in that order. Accordingly, message $M_A$ is granted access to the resource lock first, $M_B$ is granted access to the resource lock second, and $M_C$ is granted access to the resource lock third, message $M_D$ is granted access to the resource lock fourth, followed by message $M_E$.

FIG. 4A is an example table depicting an example resource lock priority order 402 before prioritization and reordering of the priority order, regardless of message relatedness, in accordance with an embodiment of the present invention.

In this example, message service 104 received six messages $M_{A-F}$, in that order. Although messages $M_A$, $M_C$, and $M_F$ are related, message service 104 does not discern message relatedness, does not assign priorities, and assigns a resource lock allocation order by order of receipt. Accordingly, the resource lock queue would have the following resource lock allocation priority order: message $M_A$ would receive the resource lock first, message $M_B$ would receive the resource lock second, message $M_C$ would receive the resource lock third, and so on.

FIG. 4B is an example table depicting an example resource lock priority order 404 after prioritization and reordering of the priority order, in accordance with an embodiment of the present invention. In this example, plug-in API 106 receives the resource lock queue from message service 104 comprising messages $M_{A-E}$. For illustrative purposes, the following discussion is made with respect to prioritizing and reordering the existing priority order for an incoming message, message $M_F$. In this example, plug-in API 106 can receive the resource lock queue from message service 104.

Plug-in API 106 can then determine whether the message $M_F$ (i.e., the received message) is a related to one or more previously received messages (e.g., messages $M_{A-E}$) in the resource lock queue. Responsive to determining that message $M_F$ is a related message (e.g., related to $M_A$ and $M_C$ as segments of a larger file), plug-in API 106 can assign a priority value of "1" to message $M_F$ and can reorder the priority order of the resource lock by grouping the related messages. For example, plug-in API can "group" (i.e., reorder the priority order) the related messages by order of receipt. In this example, the reordered priority order of the resource lock queue is message $M_A$ first, message $M_C$ second, and message $M_F$, third).

In this example, plug-in API 106 determines that received messages $M_B$, $M_D$, and $M_E$ are not related to any previous received messages. Plug-in API 106 then assigns a priority value of "2" to the messages $M_B$, $M_D$, and $M_E$ respectively. Plug-in API 106 then updates the priority order to include messages $M_B$, $M_D$, and $M_E$ by order of receipt. Accordingly, the updated priority order would is: message $M_A$ first, message $M_C$, second, message $M_F$ third because those messages have a priority value of "1" followed by messages $M_B$, $M_D$, and $M_E$, because those messages have a priority value of "2."

FIG. 5A is an example table depicting an example resource lock priority order 502 between related messages before prioritization and reordering of the priority order, in accordance with an embodiment of the present invention.

In this example, message service 104 received six messages $M_{A-F}$, in that order. Message $M_D$ is unrelated to any other received message. Although messages $M_A$, $M_C$, and $M_E$ are related as segments of a larger file and messages $M_B$ and $M_F$ are related as a group of batched messages, message service 104 does not discern message relatedness, does not assign priorities, and assigns a resource lock allocation order in by order of receipt. Accordingly, the resource lock queue would have the following resource lock allocation order: message $M_A$ would receive the resource lock first, message $M_B$ would receive the resource lock second, message $M_C$ would receive the resource lock third, and so on.

FIG. 5B is an example table depicting an example resource lock priority order 504 after prioritization and reordering of the priority order, in accordance with an embodiment of the present invention. In this example, plug-in API 106 receives the resource lock queue from message service 104 comprising messages $M_{A-F}$.

Continuing the above example, plug-in API 106 can receive the resource lock queue from message service 104. Plug-in API 106 can then determine whether the received message is related to another previously received message (e.g., messages $M_{A-E}$). Responsive to determining the received message is a related message, plug-in API 106 can assign a priority to the related message, and reorder the priority order of the resource lock queue by grouping the related messages. In this example, plug-in API 106 can identify that messages $M_A$, $M_C$, and $M_E$ are related as segments of a larger file. Plug-in API 106 can further identify that messages $M_B$ and $M_F$ are related as part of a group of batched messages.

Responsive to determining that messages $M_A$, $M_C$, and $M_E$ are related, plug-in API 106 can assign the related messages a priority of "1" and reorder priority order of the resource lock queue by grouping the related messages and ordering messages $M_A$, $M_C$, and $M_E$ by order of receipt (i.e., message $M_A$ first, message $M_C$ second, and message $M_F$, third). Similarly, plug-in API 106 assigns messages $M_B$ and $M_F$ a priority of "1" and reorders the lock queue by grouping them together in the queue.

As between related messages, plug-in API 106 reorders the queue in order of receipt. In this example, message $M_A$ was received first. Thus, the group of messages related to message $M_A$ (e.g., message $M_C$, and $M_E$) are ordered first in the queue. Although message $M_B$ is also a related message, it is related to a different message (e.g., message $M_B$ is part of a batched group of message that includes message $M_F$), message $M_B$ was received second. Thus, between the two related types of messages (e.g., messages $M_A$, $M_C$, and $M_E$, and messages $M_B$ and $M_F$), messages $M_A$, $M_C$, and $M_E$ would receive access to the resource lock first, followed by messages $M_B$ and $M_F$. Message $M_D$ receives access to the resource lock last because plug-in API 106 identified that message $M_D$ is not related to any message and is assigned a priority of 2. Accordingly, the reordered and prioritized lock allocation queue has the following order: message $M_A$, message $M_C$, message $M_E$ because they had a priority of "1" and was received before message $M_B$ and $M_F$ (who also had a priority of "1") followed by message, $M_D$, because message $M_D$ had a priority of "2."

Figure 6:
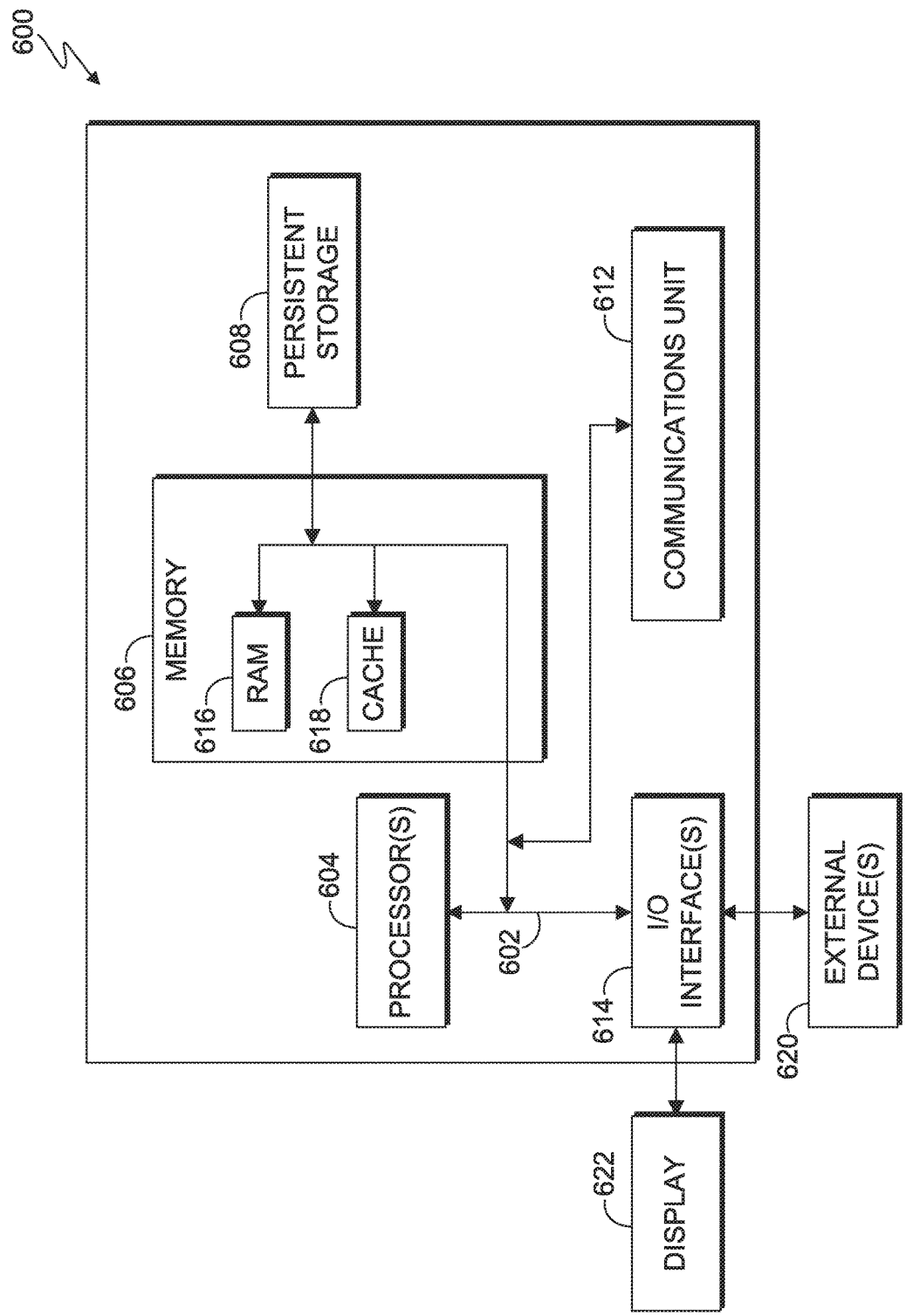
FIG. 6 is a block diagram of internal and external components of the computer systems of FIG. 1, in accordance with an embodiment of the present invention.

FIG. 6 is a block diagram of internal and external components of a computer system 600, which is representative of the computer systems of FIG. 1, in accordance with an embodiment of the present invention. It should be appreciated that FIG. 6 provides only an illustration of one implementation and does not imply any limitations with regard to the environments in which different embodiments may be implemented. In general, the components illustrated in FIG. 6 are representative of any electronic device capable of executing machine-readable program instructions. Examples of computer systems, environments, and/or configurations that may be represented by the components illustrated in FIG. 6 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 600 includes communications fabric 602, which provides for communications between one or more processors 604, memory 606, persistent storage 608, communications unit 612, and one or more input/output (I/O) interfaces 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media. Software is stored in persistent storage 608 for execution and/or access by one or more of the respective processors 604 via one or more memories of memory 606.

Persistent storage 608 may include, for example, a plurality of magnetic hard disk drives. Alternatively, or in addition to magnetic hard disk drives, persistent storage 808 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 608 can also be removable. For example, a removable hard drive can be used for persistent storage 608. Other examples include optical and magnetic disks, thumb drives, and smart cards that are inserted into a drive for transfer onto another computer-readable storage medium that is also part of persistent storage 608.

Communications unit 612 provides for communications with other computer systems or devices via a network (e.g., network 108). In this exemplary embodiment, communications unit 612 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computer system 102 through communications unit 612 (e.g., via the Internet, a local area network or other wide area network). From communications unit 612, the software and data can be loaded onto persistent storage 608.

One or more I/O interfaces 614 allow for input and output of data with other devices that may be connected to computer system 600. For example, I/O interface 614 can provide a connection to one or more external devices 620 such as a keyboard, computer mouse, touch screen, virtual keyboard, touch pad, pointing device, or other human interface devices. External devices 620 can also include portable computer-readable storage media such as, for example, thumb drives, portable optical or magnetic disks, and memory cards. I/O interface 614 also connects to display 622.

Display 622 provides a mechanism to display data to a user and can be, for example, a computer monitor. Display 622 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams shown in FIGS. 1, 2, 3, and 6 illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more computer processors, an error message;
   determining, by one or more computer processors, whether the error message is related to one or more messages in a queue, wherein determining that the received error message is related to one or messages in the queue comprises:
      reading, by one or more computer processors, a file name associated with the received error message to identify an identifier that indicates relatedness to one or more messages in the queue,
      comparing, by one or more computer processors, respective file names associated with one or more messages in the queue to the file name associated with the received error message, and
      determining, by one or more computer processors, that the identifier of the error message indicates that the error message is related to one or more messages in the queue;
   responsive to determining that the error message is related to one or more messages in the queue, assigning, by one or more computer processors, the error message a higher priority value than the related one or more messages in the queue; and
   reordering, by one or more computer processors, the messages in the queue so that the error message is in a first position ahead of the related one or more messages.

2. The method of claim 1, further comprising:
   receiving, by one or more computer processors, a first message in a queue of messages;
   determining, by one or more computer processors, whether the received first message is related to one or more messages in the queue;
   responsive to determining that the first message is related to one or more messages in the queue, assigning, by one or more computer processors, a priority value to the first message; and
   assigning, by one or more computer processors, a priority order to the first message, wherein the priority order indicates a position in which the first message is granted access to a resource locks.

3. The method of claim 1, wherein the identifier is text associated with a file name that indicated one or more of: an associated group or an associated segment.

4. The method of claim 2, wherein assigning a priority value to the first message comprises:
   assigning, by one or more computer processors, a priority value to the first message such that the priority value is assigned is equal to the related one or more messages.

5. The method of claim 2, wherein assigning a priority order to the first message comprises:
   assigning, by one or more computer processors, a priority order to the first message based, at least in part, on the assigned priority value and an order of receipt of the first message; and
   reordering, by one or more computer processors, the priority order to position the first messages with the related one or more messages based on the order of receipt.

6. The method of claim 1, further comprising:
   sending, by one or more computer processors, the queue of messages to respective one or more intended recipients, according to the priority order.

7. A computer program product comprising:
   one or more computer readable storage media and program instructions stored on the one or more computer readable storage media, the program instructions comprising:
      program instructions to receive an error message;
      program instructions to determine whether the error message is related to one or more messages in a queue, wherein the program instructions to determine that the received error message is related to one or more messages in the queue comprise:
         program instructions to read a file name associated with the received error message to identify an identifier that indicates relatedness to one or more messages in the queue,
         program instructions to compare respective file names associated with one or more messages in the queue to the file name associated with the received error message, and
         program instructions to determine that the identifier of the error message indicates that the error message is related to one or more messages in the queue;
      program instructions to, responsive to determining that the error message is related to one or more messages in the queue, assign the error message a higher priority value than the related one or more messages in the queue; and
      program instructions to reorder the messages in the queue so that the error message is in a first position ahead of the related one or more messages.

8. The computer program product of claim, 8 wherein the program instructions stored on the one or more computer-readable storage media further comprise:
   program instructions to receive a first message in a queue of messages;
   program instructions to determine whether the received first message is related to one or more messages in the queue;
   program instructions to, responsive to determining that the first message is related to one or more messages in the queue, assign a priority value to the first message; and
   program instructions to assigning, by one or more computer processors, a priority order to the first message, wherein the priority order indicates a position in which the first message is granted access to a resource locks.

9. The computer program product of claim 7, wherein the identifier is text associated with a file name that indicated one or more of: an associated group or an associated segment.

10. The computer program product of claim 8, wherein the program instructions to assign a priority value to the first message comprise:
   program instructions to assign a priority value to the first message such that the priority value is assigned is equal to the related one or more messages.

11. The computer program product of claim 8, wherein the program instructions to assign a priority order to the first message comprise:
   program instructions to assign a priority order to the first message based, at least in part, on the assigned priority value and an order of receipt of the first message; and
   program instructions to reorder the priority order to position the first messages with the related one or more messages based on the order of receipt.

12. The computer program product of claim 7, wherein the program instructions stored on the one or more computer-readable storage media further comprise:
   program instructions to send the queue of messages to respective one or more intended recipients, according to the priority order.

13. A computer system comprising:
   one or more computer processors;
   one or more computer-readable storage media;
   program instructions stored on the computer-readable storage media for execution by at least one of the one or more processors, the program instructions comprising:
      program instructions to receive an error message;
      program instructions to determine whether the error message is related to one or more messages in a queue, wherein the program instructions to determine that the received error message is related to one or more messages in the queue comprise:
         program instructions to read a file name associated with the received error message to identify an identifier that indicates relatedness to one or more messages in the queue,
         program instructions to compare respective file names associated with one or more messages in the queue to the file name associated with the received error message, and
         program instructions to determine that the identifier of the error message indicates that the error message is related to one or more messages in the queue;
      program instructions to, responsive to determining that the error message is related to one or more messages in the queue, assign the error message a higher priority value than the related one or more messages in the queue; and
      program instructions to reorder the messages in the queue so that the error message is in a first position ahead of the related one or more messages.

14. The computer system of claim 13, wherein the program instructions stored on the one or more computer-readable storage media further comprise:
   program instructions to receive a first message in a queue of messages;
   program instructions to determine whether the received first message is related to one or more messages in the queue;
   program instructions to, responsive to determining that the first message is related to one or more messages in the queue, assign a priority value to the first message; and
   program instructions to assigning, by one or more computer processors, a priority order to the first message, wherein the priority order indicates a position in which the first message is granted access to a resource locks.

15. The computer system of claim 13, wherein the identifier is text associated with a file name that indicated one or more of: an associated group or an associated segment.

16. The computer system of claim 14, wherein the program instructions to assign a priority value to the first message comprise:
   program instructions to assign a priority value to the first message such that the priority value is assigned is equal to the related one or more messages.

17. The computer system of claim 14, wherein the program instructions to assign a priority order to the first message comprise:
   program instructions to assign a priority order to the first message based, at least in part, on the assigned priority value and an order of receipt of the first message; and
   program instructions to reorder the priority order to position the first messages with the related one or more messages based on the order of receipt.

* * * * *